United States Patent [19]

Dellanno et al.

[11] Patent Number: 5,290,091
[45] Date of Patent: Mar. 1, 1994

[54] APPARATUS FOR PREVENTING WHIPLASH

[76] Inventors: Ronald P. Dellanno, 40 Fox Run, North Caldwell, N.J. 07006; Quentin E. Gualtier, 16 Winding Way, North Caldwell, N.J. 07006

[21] Appl. No.: 8,209

[22] Filed: Jan. 25, 1993

Related U.S. Application Data

[63] Continuation-in-part of Ser. No. 771,827, Oct. 7, 1991, Pat. No. 5,181,763, which is a continuation of Ser. No. 585,392, Sep. 20, 1990, abandoned.

[51] Int. Cl.⁵ .............................................. A47C 7/36
[52] U.S. Cl. .................................. 297/391; 297/404; 297/408; 297/216.12
[58] Field of Search ............... 297/391, 396, 408, 216, 297/404, 410; 5/636, 632

[56] References Cited

U.S. PATENT DOCUMENTS

| | | | |
|---|---|---|---|
| D. 276,938 | 12/1984 | Pedersen | D24/36 |
| 2,973,029 | 2/1961 | Schlosstein | 297/216 |
| 2,990,008 | 6/1961 | Bien | 297/397 |
| 3,071,412 | 1/1963 | Meade | 297/391 |
| 3,706,472 | 12/1972 | Mertens | 297/397 |
| 4,256,341 | 3/1981 | Goldner et al. | 297/410 |
| 4,285,081 | 8/1981 | Price | 297/391 X |
| 4,424,599 | 1/1984 | Hannouche | 5/632 |
| 4,466,662 | 8/1984 | McDonald et al. | 297/391 X |
| 4,693,515 | 9/1987 | Russo et al. | 397/391 |
| 4,754,513 | 7/1988 | Rinz | 5/636 X |
| 4,829,614 | 5/1989 | Harper | 5/632 |
| 4,832,007 | 5/1989 | Davis, Jr. et al. | 5/632 X |
| 4,865,388 | 9/1989 | Nemoto | 297/403 |
| 4,944,554 | 7/1990 | Gross et al. | 297/391 X |
| 5,181,763 | 1/1993 | Dellanno et al. | 297/391 |

*Primary Examiner*—James R. Brittain
*Assistant Examiner*—Milton Nelson, Jr.
*Attorney, Agent, or Firm*—Klauber & Jackson

[57] ABSTRACT

Apparatus for preventing whiplash-related injuries to a passenger in a vehicle. The apparatus includes a frame supported on a seat of the vehicle and located behind the cranium and cervical spine of a passenger on the seat. A layer of resilient material is supported on the frame, and defines a supporting means located behind the cranium and cervical spine of the passenger which defines one or more contours that interfit with the posterior contour of the passenger's cranium and cervical spine. The apparatus thereby contacts and supports the posterior portion of the passenger's cervical spine substantially simultaneously with contact and support of the passenger's cranium, thereby substantially simultaneously decelerating the cranium and cervical spine during a vehicle collision to prevent whiplash-related injuries to the passenger.

11 Claims, 6 Drawing Sheets

APPARATUS FOR PREVENTING WHIPLASH

RELATED APPLICATIONS

This application is a continuation-in-part of our co-pending application Ser. No. 771,827 (now U.S. Pat. No. 5,181,763), filed Oct. 7, 1991, which is a continuation of Ser. No. 585,392, filed Sept. 20, 1990 abandoned.

FIELD OF THE INVENTION

The present invention relates to apparatus for hygienically supporting a person's cranium and cervical spine including passenger safety apparatus for vehicles and, particularly, apparatus for preventing whiplash related injuries.

BACKGROUND INFORMATION

Whiplash related injuries are caused by the rapid acceleration of a person's cranium and cervical spine, which occurs, for example, in an automobile collision. The rapid acceleration causes the extension and flexion of the cervical spine which, in turn, can cause severe injury. Types of whiplash related injuries include fractured and/or dislocated vertebrae, torn ligaments (both anterior and posterior of the spinal column), and avulsion of parts of the vertebrae, ligaments and intervertebrae discs.

It has been found that the C4, C5 and C6 cervical vertebrae, and the paravertebrae ligaments are most often damaged with whiplash related injuries, although the entire cervical spine may well be involved. Rapid hyperextension of the cervical spine can stretch the anterior logitudinal ligament, thus placing it in traction and causing either bone or ligamentous damage. Such hyperextension typically damages the C1 through C7 cervical vertebrae. The vertebral artery, which extends through an opening in the vertebrae, and the sympathetic nerve fibers that surround the artery are also often damaged. These types of injuries cause severe disabilities and, in some instances, death.

Seatbacks and/or headrests in automobiles, trucks, and other types of vehicles are provided to prevent whiplash related injuries to passengers during collisions, but typically fail. During a rear-end vehicle collision, the forces of the collision typically cause a passenger's cranium and cervical spine to rapidly accelerate toward the rear of the vehicle. Once the cranium strikes the seatback or headrest, it then rapidly accelerates in the opposite direction toward the front of the vehicle. The rearward acceleration of the cranium, and resulting collision with the seatback or headrest, causes hyperextension of the cervical spine and, thus, typically injures the anterior structure of the passenger's neck. The forward acceleration of the cranium, on the other hand, causes hyperflexion of the cervical spine and typically injures the posterior structure of the neck.

One problem with known seatbacks and/or headrests is that the surface intended to stop the movement of a person's head and neck is typically flat, or does not correspond to the posterior contour thereof. As a result, during a rear-end collision, typically the back, or posterior portion of the cranium is the first portion of the passenger's body to strike the seatback or headrest. However, the cervical spine, which is located inferiorly with respect to the posterior portion of the cranium, continues to move toward the headrest. As a result, the cervical spine is forced to move relative to the cranium which, in turn, causes severe vertebral damage.

Also, the top surfaces of many known headrests are located at about the same height, or below the height of a passenger's ears, which is normally about the center of gravity of the head. When a passenger's cranium is forced against such a headrest during a collision, it often slides upwardly over the top edge of the headrest. As a result, the cranium is stretched upwardly relative to the cervical spine, typically causing further vertebral damage.

It is an object of the present invention, therefore, to overcome the problems and disadvantages of known apparatus for preventing whiplash, such as vehicle headrests and seatbacks.

SUMMARY OF THE INVENTION

Now in accordance with the present invention, apparatus is provided for preventing whiplash-related injuries to a passenger in a vehicle. The apparatus comprises a frame supported on a seat of the vehicle and located behind the cranium and cervical spine of a passenger on the seat. A layer of resilient material is supported on the frame, the layer of resilient material defining a supporting means located behind the cranium and cervical spine of the passenger and defining one or more contours that interfit with the posterior contour of the passenger's cranium and cervical spine. The supporting means includes a first surface located behind the passenger's cranium and projecting upwardly above the approximate center of mass of the passenger's cranium and having a substantially flat portion including a cranium contact zone for contacting and supporting the approximate central posterior area of the passenger's cranium; and a second surface located below the first surface and defining a substantially convex smooth curve, the maximum protrusion point of which projects anteriorly relative to the flat portion of the first surface a distance of 1½ to 4 inches, the maximum protrusion point being about 3 to 8 inches in the vertical direction below the cranium contact zone. The second surface thereby contacts and supports the posterior portion of the passenger's cervical spine substantially simultaneously with the contact of the passenger's cranium with the first surface, thereby substantially simultaneously decelerating the cranium and cervical spine during a vehicle collision to prevent whiplash-related injuries to the passenger.

In one embodiment of the invention, the second surface is smoothly joined to the first surfaces by a transition surface which extends anteriorly at an obtuse angle from the first surface and is located to support the passenger's posterior area approximately where the cranium meets the cervical spine. The maximum protrusion point of the first surface preferably projects anteriorly relative to the flat portion of the first surface a distance of 1½ to 3 inches; and the maximum protrusion point is preferably from 5 to 7 inches below said cranium contact zone.

A support member is coupled to the frame and supported on the seat, the support member being vertically moveable relative to the seat to adjust the position of the apparatus relative to the passenger and, thus, adjust the position of the supporting means to correspond to the posterior contour of the passenger's cranium and cervical spine.

The frame can define a hollow enclosure and the layer of resilient material may consist essentially of a urethane foam which is molded thereon.

The frame is journaled to the support member and normally biased toward the front of the seat, whereupon during a vehicle collision, when the passenger's head is forced toward the apparatus, the posterior portion of the passenger's cranium initially contacts the first surface of the supporting means and rotates the frame relative to the support member toward the back of the seat and, in turn, rotates the second supporting surface into contact with the posterior portion of the passenger's lower cranium and cervical spine. The support member includes two support legs and a bar extending therebetween, the two support legs being oriented substantially parallel relative to each other and supported on the seat, and the frame is journaled to the bar; and the apparatus further includes a stop member coupled to the bar and projecting upwardly therefrom; a stop plate coupled to the frame and adapted to slide relative to the stop member; and a spring coupled between the stop plate and the bar, wherein the spring biases the stop plate to slide relative to the stop member toward the front of the seat and, thus, biases the stop plate and frame toward the passenger's head.

The stop plate defines an elongated aperture extending therethrough and adapted to receive the stop member therein, the elongated aperture permitting the stop plate to slide toward the front of the seat until a back wall defining the aperture engages the stop member to orient the apparatus in a downwardly rotated position, the elongated aperture further permitting the stop plate to slide toward the rear of the seat until a front wall defining the aperture abuts the stop member to orient the apparatus in an upright position.

In a further embodiment of the apparatus, the first and second surfaces are defined at mutually spaced first and second support bodies, and the apparatus further includes means for vertically and horizontally displacing the first and second surfaces to adjust the position of same to accurately interfit with the posterior contour of different passengers.

The first and second support bodies can be coupled to the frame and rendered movable by rack and pinion or equivalent means to enable desired vertical and/or horizontal displacements of same.

One advantage of the apparatus of the present invention is that because the supporting surface has a contour that corresponds to or interfits with the posterior contour of the passenger's cranium and cervical spine, the apparatus can substantially simultaneously decelerate the cranium and cervical spine during a vehicle collision. As a result, whiplash related injuries typically encountered in such collisions are ordinarily avoided.

Other advantages of the apparatus of the present invention will become apparent in view of the following detailed description and drawings taken in connection therewith.

DETAILED DESCRIPTION

Figure 1:
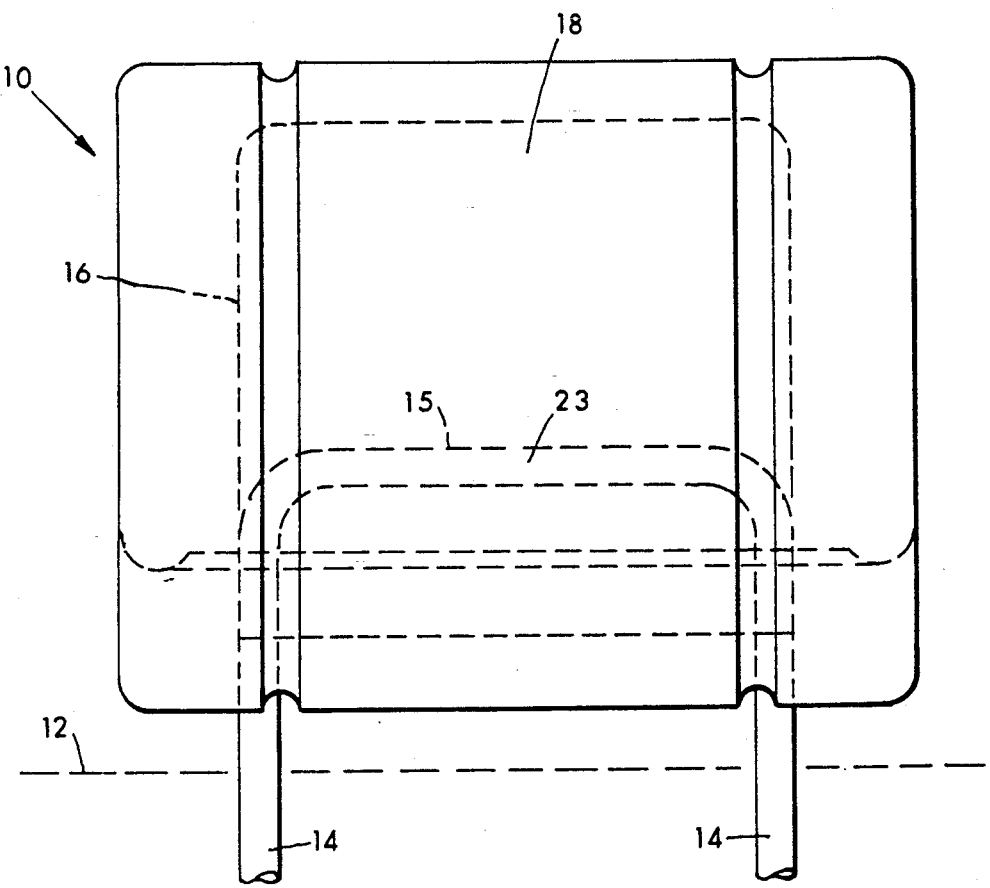
FIG. 1 is a front plan view of an apparatus for preventing whiplash related injuries embodying the present invention.
Figure 2:
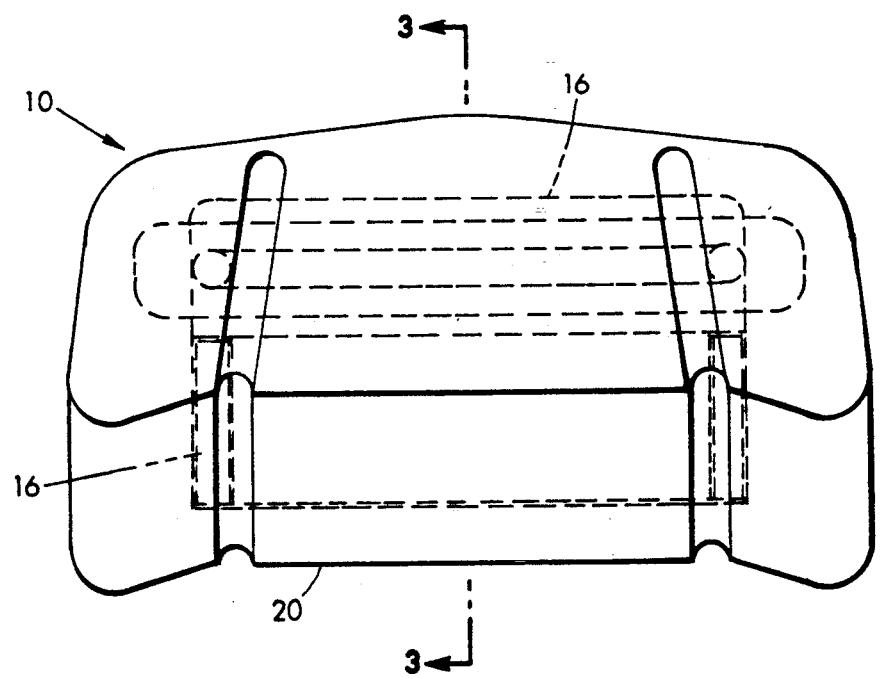
FIG. 2 is a top plan view of the apparatus of FIG. 1.
Figure 3:
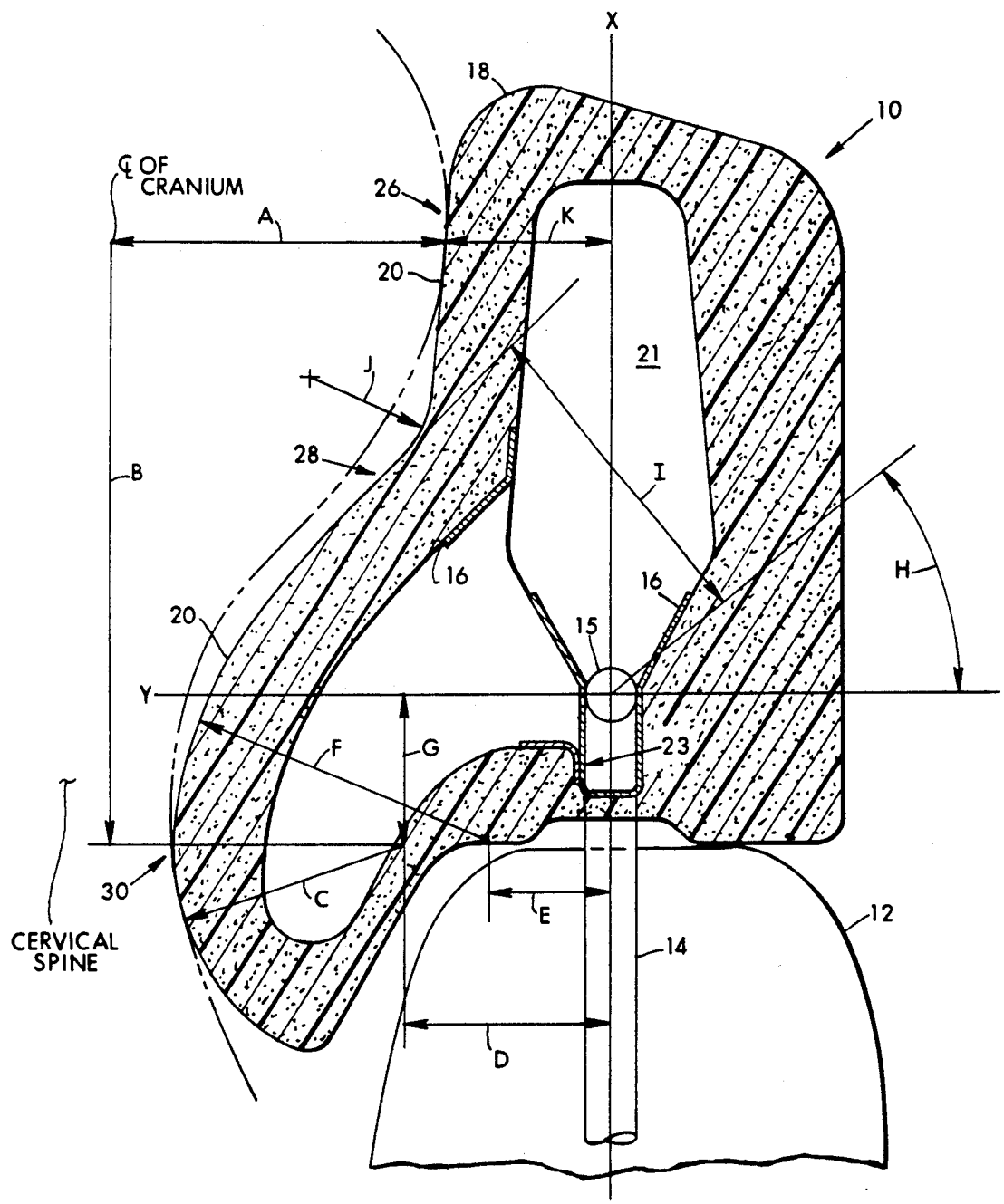
FIG. 3 is a cross-sectional view taken along the line 3—3 of FIG. 2, illustrating the contour of a typical passenger's cranium and cervical spine in broken lines.

In FIGS. 1 through 3 an apparatus embodying the present invention for preventing whiplash related injuries is indicated generally by the reference numeral 10. The apparatus 10 is used as a headrest in a motor vehicle (not shown) and is supported on the top of a seatback 12 (illustrated schematically in dashed lines in FIG. 1). The apparatus 10 is mounted on a support member including two vertical support legs 14 coupled together by a horizontal bar 15. The vertical support legs 14 are supported within the seatback 12, and are adjustable for adjusting the height of the apparatus 10 relative to the seatback 12, in a manner known to those skilled in the art.

The apparatus 10 comprises an inner frame 16 coupled to the horizontal bar 15 and support legs 14. A resilient foam outer layer 18 is molded onto the inner frame 16. The foam layer 18 preferably consists essentially of a urethan foam typically used to make auotmobile headrests. As shown in FIG. 3, the inner frame 16 and foam layer 18 define a head and neck supporting means 20 on the front of the apparatus 10.

The posterior contour of a typical passenger's cranium and cervical spine is illustrated in phantom lines in FIG. 3. As can be seen, the supporting means 20 is shaped to conform to the typical posterior contour. The supporting means 20 therefore includes a first surface 26 located to contact and support the approximate central posterior area of the passenger's cranium; a second surface 30, which is located to contact and support the posterior area of the cervical spine; and a transition surface 28 which extends outwardly at an obtuse angle from the first surface to smoothly join the first and second surfaces, and is located to contact and support the posterior area approximately where the cranium meets the cervical spine. Thus, as shown in FIG. 3, because the contour of the means 20 corresponds to or interfits with the posterior contour of the cranium and cervical spine, such means substantially simultaneously contacts and support the respective adjacent portions of the passenger's body when moved into contact therewith.

One advantage of the apparatus 10 of the present invention, is that during a rear-end collision, when the passenger is forced toward the seatback 12, the passenger's cranium and cervical spine substantially simultaneously strike the supporting means 20. The soft foam layer 18 absorbs the force of the collision and, in turn, substantially simultaneously decelerates the cranium and cervical spine. As a result, the apparatus 10 minimizes the risk of the occurrence of whiplash related injuries, because there is little movement of the cervical spine relative to the cranium during the collision. The frame 16 of the apparatus 10 is formed to define a hollow enclosure 21, as shown in FIG. 3. The foam layer 18 can, therefore, be molded directly onto the frame 16 in a manner known to those skilled in the art, such as by reaction injection molding. The bottom portion of the frame 16 is welded to the horizontal bar 15 and support legs 14 at several weld locations, indicated typically by the reference numeral 23 in FIG. 1. The apparatus 10 is vertically adjustable by moving the support legs 14 up or down, so that the means 20 corresponds to and interfits with the posterior contour of the passenger's cranium and cervical spine, as shown in FIG. 3.

The dimensions of means 20 are based on dimensions of the craniums and cervical spines of typical passengers. Referring to FIG. 3, it has been found that the dimension A, which is the approximate radius of the posterior portion of a passenger's cranium, is typically about 3 inches. The dimension B, which is the approximate vertical distance from the cranium contact zone, i.e. where the passenger's cranium contacts the flat part of first surface 26 to the maximum anterior protrusion point of surface 30 is from 3 to 8 inches, is preferably from about 5 to 7 inches, and for use with a typical adult passenger will be about 6 inches. This also represents the vertical distance from the cranium center to the center line of the fifth vertebrae.

The means 20 of the apparatus 10 is shaped and dimensioned to substantially match the contour of a cranium and cervical spine based on these typical passenger's dimensions. The maximum protrusion point of surface 30 projects anteriorily relative to the flat portion of surface 26 a distance of from 1½ to 4 inches, and preferably from 1½ to 3 inches. Although the apparatus 10 does not exactly match the contour of every passenger's cranium and cervical spine, it substantially matches the contour for most passengers. As a result, it substantially simultaneously decelerates the cranium and cervical spine during a vehicle collision and, accordingly, prevents the occurrence of whiplash related injuries.

EXAMPLE

The dimensions (in inches) used for constructing the supporting means 20 to match the posterior contour of a typical passenger's cranium and cervical spine in accordance with the present invention, as shown in FIG. 3, are as follows:

A = 3.0
B = 6.0
C = 2¼ (radius)
D = 2.0
E = 13/16
F = 3 7/16 (radius)
G = 1⅜
H = 45°
I = 2 15/16
J = 1¼ (radius)
K = 1 7/16

The dimension C is the radius of the second surface 30 adapted to contact the cervical spine. The dimension D is the distance from the center line of the support legs 14 (the X axis) to the center of the radius C. The dimension F is the radius of the means 20 where the transition surface 28 meets the second surface 30. The dimension G is the distance from the center line of the horizontal bar 15 (the Y axis) to the center of the radius C. The angle H is the angle of a construction line drawn with respect to the Y axis.

The dimension I is the distance from the construction line drawn along the angle H to a portion of the transition 28 of the means 20. The dimension J is the blend radius where the first surface 26 meets the transition surface 28. And the dimension K is the distance between the center line of the support legs 14 (the X axis), and a portion of the first surface 26.

It should be pointed out that although these dimensions have been found to be appropriate for the embodiment of the apparatus 10 illustrated, they may be varied within the scope of the present invention. For example, if it is determined that the typical dimensions A and B may be different for a group of passengers than as determined above, then the other dimensions of the apparatus 10 will change accordingly. Thus, in accordance with the present invention, the dimensions can be varied by those skilled in the art to ensure that the contour of the surface 20 matches the posterior contour of a typical passenger's cranium and cervical spine. In this way, during a vehicle collision, the apparatus 10 can substantially simultaneously decelerate the cranium and cervical spine and, as a result, prevent the occurrence of whiplash related injuries.

In FIGS. 4 through 7, another apparatus embodying the present invention is indicated generally by the reference numeral 110. The apparatus 110 is used as a headrest in a motor vehicle (not shown), and is mounted on a support including a pair of vertical support legs 112 coupled together by a horizontal bar 113. The support legs 112 are supported within a seatback 114 (illustrated schematically in dashed lines in FIG. 5). The support legs 112 are vertically adjustable to adjust the position of the apparatus 110 relative to the cranium and cervical spine of a passenger (as illustrated in broken lines in FIGS. 4 and 6), in a manner known to those skilled in the art.

The apparatus 110 comprises a foam outer layer 116 molded onto a housing 118. The foam layer 116 preferably consists essentially of a urethane foam of a type typically used to make headrests. The foam layer 116 is directly molded onto the housing 118, in a manner known to those skilled in the art, such as by reaction injection molding. The housing 118 is rotatably supported on the horizontal bar 113 and, therefore, is movable in the direction indicated by the arrows in FIG. 4, as described further below.

Figure 4:
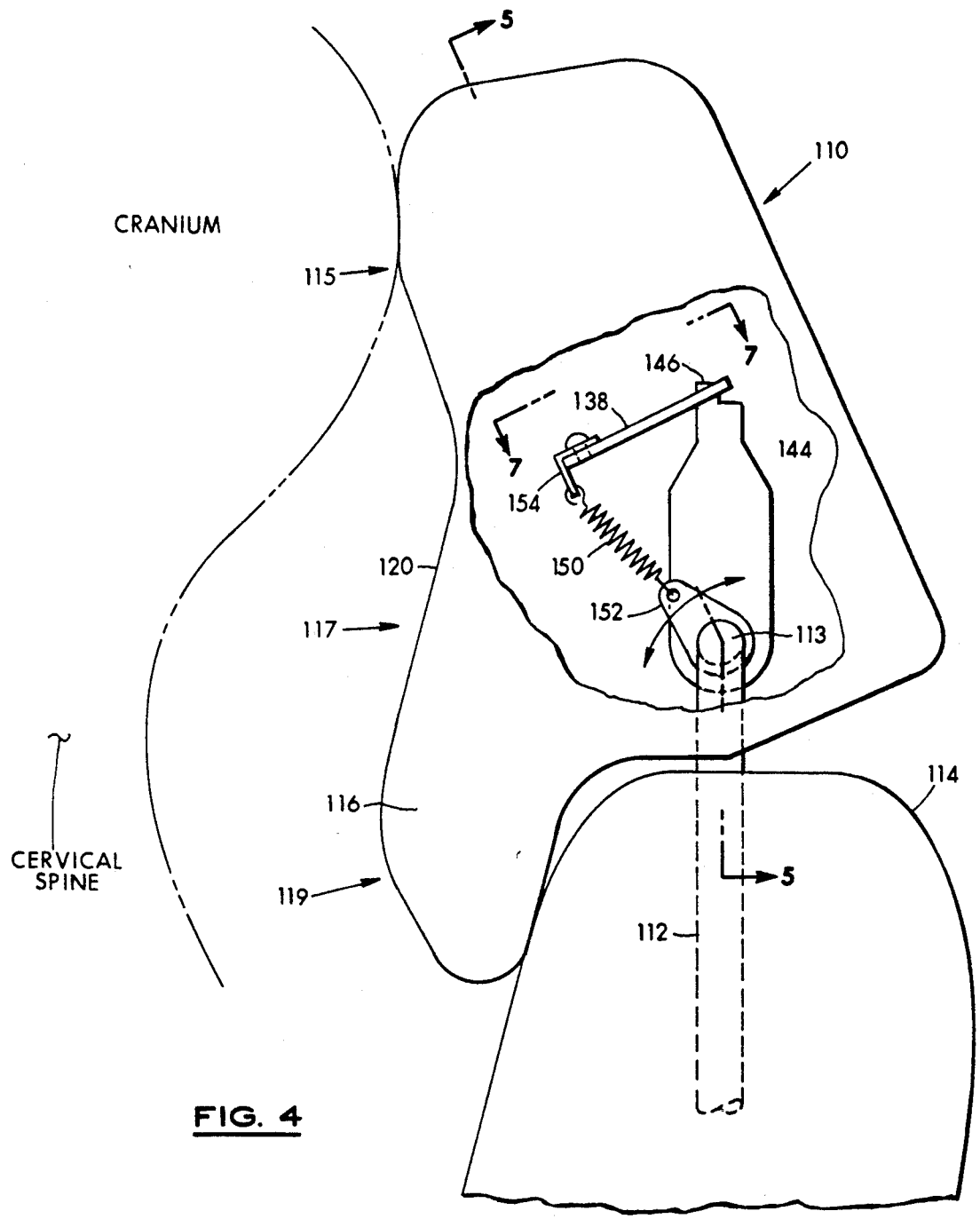
FIG. 4 is a side plan view, illustrated in partial cross-section, of another apparatus for preventing whiplash related injuries embodying the present invention, illustrating the posterior contour of a typical passenger's cranium and cervical spine in broken lines.
Figure 6:
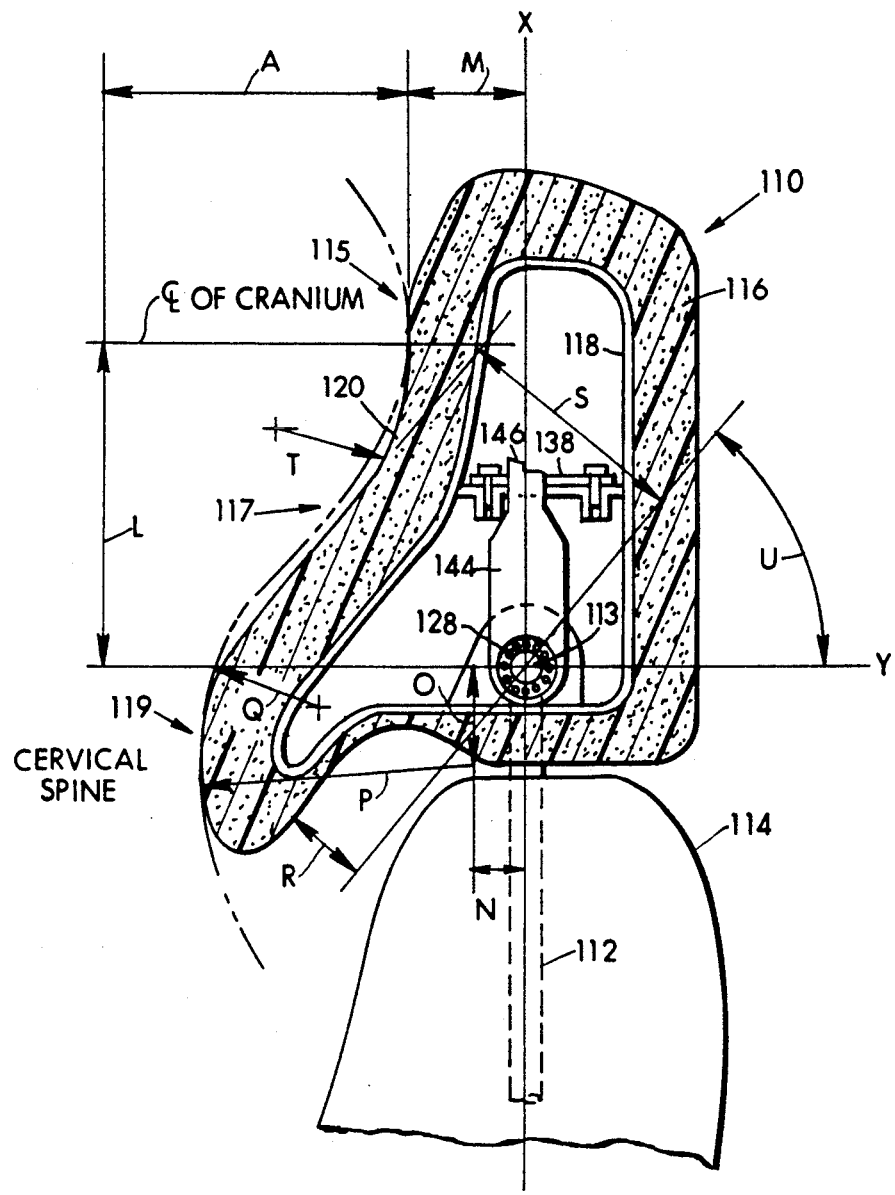
FIG. 6 is a cross-sectional view of the apparatus of FIG. 5, taken along the line of 6—6 of FIG. 5, and illustrating the posterior contour of a typical passenger's cranium and cervical spine in broken lines.

The apparatus 110 defines a head and neck supporting means 120, as illustrated in FIGS. 4 and 6. The supporting means 120 is shaped to conform to the posterior contour of a typical passenger's cranium and cervical spine, as shown in FIG. 6. The supporting means 120 includes a first contact surface 115, a transition contact surface 117, and a second contact surface 119. As shown in FIGS. 4 and 6, the first surface 115 is located and shaped to support the approximate central posterior area of the passenger's cranium; the transition surface 117 is located and shaped to support the posterior area approximately where the passenger's cranium meets the cervical spine; and the second contact surface 119 is located and shaped to support the posterior area of the passenger's cervical spine.

Accordingly, during a vehicle collision, if the passenger's head is thrown back toward the seatback 114, the first contact surface 115, transition surface 117, and second contact surface 119 substantially simultaneously decelerate the cranium and cervical spine, as described further below. As a result, there is minimal movement of the spine and, accordingly, the occurrence of whiplash related injuries is ordinarily avoided.

Figure 5:
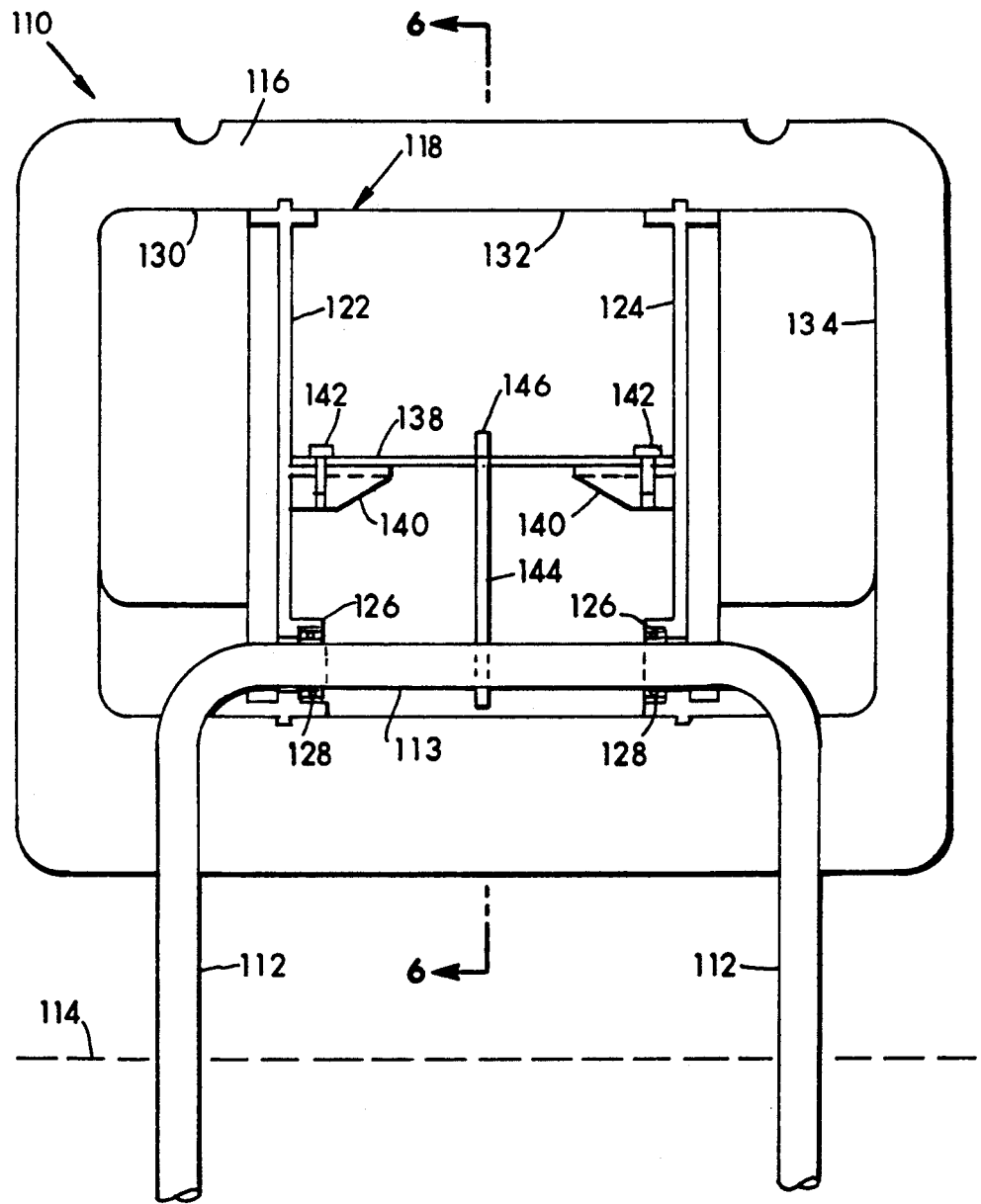
FIG. 5 is a cross-sectional view of the apparatus of FIG. 4, taken along the line 5—5 of FIG. 4.

As shown in FIG. 5, the housing 118 comprises a left frame 122, and a right frame 124. Both the left and right frames are supported by the horizontal bar 113, and project upwardly therefrom in a direction substantially perpendicular thereto. Each of the frames 122 and 124 includes a flange 126, which is journaled to the horizontal bar 113 by sealed radial ball bearings 128. The housing 118 is therefore rotatable relative to the support legs 112, as indicated by the arrows in FIG. 4.

The housing 118 further comprises a left enclosure 130, a center enclosure 132, and a right enclosure 134. The left enclosure 130 and the left side of the center enclosure 132 are coupled to the left frame 122 on either side thereof. The right enclosure 134 and the right side of the center enclosure 132, on the other hand, are coupled to the right frame 134 on either side thereof. The enclosures 130, 132 and 134 are, accordingly, coupled to each other to form the enclosed frame 118. The front face of each of the enclosures 130, 132, and 134 is shaped to support the foam layer 116 and form the support means 120. The support means 120 is, accordingly, shaped and dimensioned to correspond to the posterior contour of a typical passenger's cranium and cervical spine, as shown in FIGS. 4 and 6.

A top plate 138 is coupled to and extends between the left frame 122 and right frame 124. Each of the frames 122 and 124 includes a support shelf 140 for supporting the stop plate 138 thereon. The stop plate 138 is coupled on either end to the support shelves 140 by fasteners 142. A stop 144 is coupled to the center of the horizontal bar 113, preferably by welding, and extends upwardly therefrom in a direction substantially perpendicular to the axial direction thereof, as illustrated in FIGS. 4 through 6. The stop 144 includes a knob 146 extending upwardly from a top surface thereof.

Figure 7:
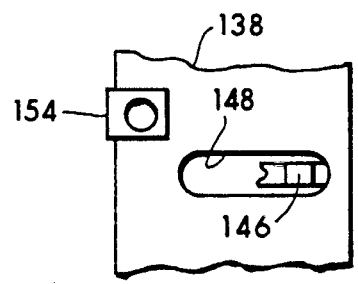
FIG. 7 is a top plan view of a portion of the apparatus of FIG. 4, taken along the line 7—7 of FIG. 4.

As shown in FIG. 7, the knob 146 is dimensioned to be received within an elongated aperture 148, extending through the center portion of the stop plate 138. The aperture 148 is dimensioned so that when the apparatus 110 is rotated back toward the seatback 114, the front wall of the aperture 148 engages the knob 146 and, thus, maintains the apparatus 110 in an upright position, as shown in FIG. 6. Then, when the apparatus 110 is permitted to rotate toward the front of the seatback 114, the knob 146 slides through the elongated aperture 148. The knob 146, in turn, engages the back wall of the aperture 148 and, accordingly, maintains the apparatus 110 in a downwardly rotated position, as shown in FIG. 4.

An extension spring 150 is coupled between the front of the stop plate 138, and the horizontal bar 113. A slip ring 152 is fitted on one end over the horizontal bar 113, and coupled on the other end to the extension spring 150. The other end of the extension spring 150 is coupled to the front end of the stop plate 138 by a fastener 154. The slip ring 152 is rotatable relative to the horizontal bar 113 and, therefore, permits the extension spring 150 and stop plate 138 to rotate relative to the stop 144. The extension spring 150 normally biases the stop plate 138 in the forward position against the knob 146, as shown in FIG. 4. Therefore, the apparatus 110 is normally maintained in a forward rotated position so that the first surface 115 of the support means 120 is maintained in contact with, or in close proximity to, the posterior portion of the passenger's cranium, as shown in FIG. 4.

However, in the event of a collision, if the passenger's head is thrown back toward the seatback 114, the cranium initially contacts the first surface 115 of the support means 120 and, in turn, causes the apparatus 110 to rotate in the direction back toward the seatback 114. As a result, the transition surface 117 and second surface 119 of the support means 120 are each rotated into engagement with the respective posterior portions of the cranium and cervical spine, as shown in FIG. 6. Thus, when both the posterior portions of the cranium and cervical spine engage the support means 120, the means 120 substantially simultaneously decelerates both portions of the body. As a result, the occurrence of whiplash related injuries is ordinarily avoided. Then, once the passenger's head moves back toward the front of the vehicle and away from the seatback 114, the extension spring 150 causes the apparatus 110 to rotate toward the front of the seatback 114, and thus follow the passenger's head.

The dimensions of the support means 120 of the apparatus 110 are determined in the same way as the dimensions of the support means 20 described above in relation to FIGS. 1 through 3. Accordingly, the dimensions (in inches) used for constructing the support means 120 to match the posterior contour of a typical passenger's cranium and cervical spine, in accordance with the present invention, are as follows:

$A = 3.0$
$L = 4\frac{3}{8}$
$M = 1\ 9/16$
$N = \frac{5}{8}$
$O = 1\frac{1}{8}$
$P = 3\ 13/16$
$Q = 1\frac{1}{4}$ (radius)
$R = 1\frac{1}{4}$
$S = 3\ 3/16$
$T = 1\frac{1}{4}$ (radius)
$U = 50°$ The dimension A, as described above, is the approximate radius of the posterior contour of a passenger's cranium.

The dimension L is the vertical distance between the Y axis (intersecting the center line of the horizontal bar 113), and the approximate center line of a passenger's cranium. The dimension M is the distance between the center line of the support legs 112 (the X axis), and the first surface 115 of the means 120. The dimension N is the distance between the center line of the horizontal legs 112 (the X axis), and the center of the radius P. The dimension 0 is the distance between the Y axis and the center of the radius P. The dimension P is the radius of the lower portion of the second surface 119 of the means 120. The dimension Q is the blend radius of the lower portion of the means 120 where the transition surface 117 meets the second surface 119.

The dimension R is the distance between a construction line drawn along the angle U, and the portion of the under surface of the apparatus 110 facing the seatback 114. The dimension S is the distance between a construction line drawn along the angle U, and a portion of the transition surface 117 of the support means 120. The dimension T is the blend radius of the portion of the means 120 where the first surface 115 meets the transition surface 117. And the angle U is the angle of the construction line drawn parallel to a portion of the transition surface 117 of the means 120, as shown in FIG. 6, with respect to the Y axis.

It should be pointed out that although these dimensions have been found to be appropriate for the embodiment of the present invention illustrated, they may be varied within the scope of the present invention. For example, the typical dimensions of the posterior contour of the cranium and cervical spine may be different for a particular group of passengers. Thus, in accordance with the present invention, these dimensions can be varied to ensure that the contour of the means 120 matches the posterior contour of each passenger's cranium and cervical spine. Therefore, during a vehicle collision, the apparatus 110 can substantially simultaneously decelerate the cranium and cervical spine and, as a result, prevent the occurrence of whiplash related injuries.

Thus, one advantage of the apparatus of the present invention, is that during a rear-end collision, the supporting surface simultaneously decelerates the cranium and cervical spine, because it is located and shaped to match the general contour thereof. As a result, there is substantially no movement of the cranium relative to the cervical spine, as with known seatbacks and/or headrests. The occurrence of whiplash related injuries caused by damaging the cervical spine is, accordingly, ordinarily avoided.

Another advantage of the apparatus of the present invention, is that the first contact area of the supporting surface extends upwardly beyond the approximate central posterior area of the passenger's cranium, as shown in FIGS. 3 and 6. As a result, when the passenger's cranium strikes the first contact area during a collision, it is typically not permitted to slide upwardly over the top edge of the apparatus. Accordingly, vertebral damage typically associated with known seatbacks and/or headrests caused by stretching the cranium upwardly relative to the vertical spine, is avoided.

Figure 8:
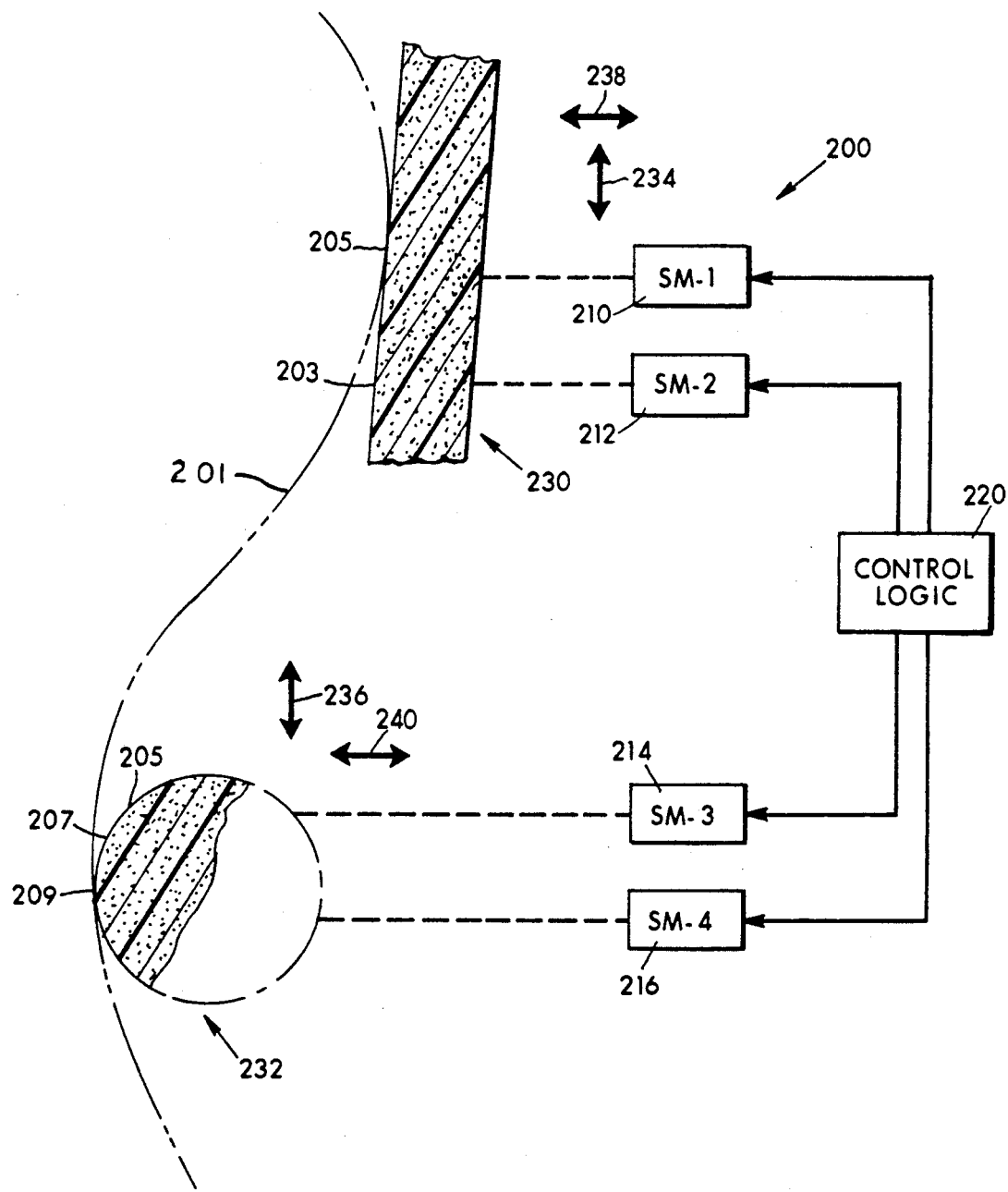
FIG. 8 a schematic cross-sectional view of a further embodiment of apparatus in accordance with the invention.

In FIG. 8 a schematic view appears, cross-sectional in nature, illustrating a further embodiment of apparatus 200 in accordance with the present invention. The partial outline of a seated passenger as described in prior embodiments, is shown in shadow at 201. In the present instances portions of first and second support surfaces 203 and 205 appear. At least where contact with the passenger is made, surface 203 and 205 comprise a resilient material as earlier discussed. The functions of these support surfaces are precisely as previously described; specifically the surface 203 is provided with a flat portion, including a cranium contact zone 205 which contacts and supports the approximate central posterior area of the passenger's cranium. The upper part of surface 20 extends above the approximate center of mass of the cranium. The second surface 205, again includes a convex, smooth curve 207 which extends anteriorly toward the passenger, where it contacts and cervical spine. The maximum protrusion point 209 of this curve will normally project anteriorly relative to the flat portion of the first surface a distance of 1½ to 4 inches, and the maximum protrusion point 209 will, in general, be about 3 to 8 inches below the cranium contact zone, as measured in a vertical direction.

The first and second surfaces, 203 and 205, in apparatus 200, are present on separate mutually spaced first and second support bodies 230 and 232. Specifically, it will be appreciated that surface 203 may be part of a distinct unit or body 230, spaced from the body 232 on which surface 205 is present. The remainder of each support body can take any convenient shape. For example, the support body 230 for first surface 203 can be of generally trapezoidal or slab shape; and the surface 205 can be a portion of a sausage-shaped body which is of circular geometry in transverse cross-section. Surface 105 can also (in cross-section) have other conic section forms—such as a parabolic curve, or an eliptical curve, etc. In practice, each of the bodies 230, 232 are separately moveable in vertical and horizontal directions to enable precise adjustment to interfit with the posterior contour of the passenger. This can be effected by suitable means, as for example shown schematically in the Figure, where servomotors 210, 212, 214, and 216 controlled by logic 220 are coupled to bodies 230 and 232 to enable each of the latter to move in the up and down vertical directions as suggested by arrows 234 and 236, and in the horizontal direction as suggested by arrows 238 and 240. Simple rack and pinion arrangements can be used for these purposes and preferably four servomotors are used, one pair of the servomoters controls vertical and horizontal movement of body 230; and the other pair of the servomoters effects vertical and horizontal movement of body 232. It will be evident to those skilled in the art that memory settings can be provided at logic 220 to enable passengers to preset the positions of support bodies 230 and 232 to enable accurate interfit with each passenger using the vehicle in which apparatus 220 is installed.

While the present invention has been particularly described in terms of specific embodiments thereof, it will be understood that numerous variations upon the invention are now enabled to those skilled in the art, which variations yet reside within the scope of the present teaching. Accordingly, the invention is to be broadly construed and limited only by the scope and spirit of the claims now appended hereto.

What is claimed is:

1. Apparatus for preventing whiplash-related injuries to a passenger in a vehicle, comprising:
   a frame supported on a seat of the vehicle and located behind the cranium and cervical spine of a passenger on the seat; and
   a layer of resilient material supported on the frame and conforming to the shape of the frame in the location behind the cranium and cervical spine of the said passenger, the layer of resilient material and underlying frame thereby defining a supporting means located behind the cranium and cervical spine of the passenger and defining at least one contour that interfits with the posterior contour of the passenger's cranium and cervical spine, and including a first surface located behind a passenger's cranium and projecting upwardly above the approximate center of mass of the passenger's cranium and including a substantially flat portion including a cranium contact zone for contacting and supporting the approximate central posterior area of the passenger's cranium, and a second surface located below the first surface and defining in vertical cross-section a substantially convex smooth curve, the maximum horizontal protrusion point of which projects anteriorly relative to the flat portion of said first surface a distance of 1½ to 4 inches, the said maximum protrusion point being about 3 to 8 inches below said cranium contact zone, said second surface thereby contacting and supporting the posterior portion of the passenger's cervical spine substantially simultaneously with the said contact of the passenger's cranium with said first surface, thereby substantially simultaneously decelerating the cranium and cervical spine during a vehicle collision to prevent whiplash-related injuries to the passenger.

2. Apparatus in accordance with claim 1, wherein the said maximum protrusion point of said second surface projects anteriorly relative to said flat portion of said first surface a distance of 1½ to 3 inches.

3. Apparatus in accordance with claim 2, wherein said maximum protrusion point is from 5 to 7 inches below said cranium contact zone.

4. Apparatus in accordance with claim 1, wherein said first and second surfaces are defined at mutually spaced first and second support bodies, each of which includes said resilient material at least where contact with said passenger is made.

5. Apparatus in accordance with claim 4, further including means for vertically and horizontally displacing said first and second support bodies to adjust the position of said first and second surfaces to accurately interfit with the posterior contour of different passengers.

6. Apparatus in accordance with claim 1, wherein said second surface is smoothly joined to said first surface by a transition surface extending anteriorly at an obtuse angle from said first surface and being located to support the passenger's posterior area approximately where the cranium meets the cervical spine.

7. An apparatus as defined in claim 6, further comprising:
a support member coupled to the frame and supported on the seat, the support member being vertically moveable relative to the seat to adjust the position of the apparatus relative to the passenger and, thus, adjust the position of the supporting means to correspond to the posterior contour of the passenger's cranium and cervical spine.

8. An apparatus as defined in claim 7, wherein the frame defines a hollow enclosure and the layer of resilient material consists essentially of a urethane foam which is molded thereon.

9. An apparatus as defined in claim 7, wherein the frame is journaled to the support member and normally biased toward the front of the seat, whereupon during a vehicle collision, when the passenger's head is forced toward the apparatus, the posterior portion of the passenger's cranium initially contacts the first surface of the supporting means and rotates the frame relative to the support member toward the back of the seat and, in turn, rotates the second supporting surface into contact with the posterior portion of the passenger's lower cranium and cervical spine.

10. An apparatus as defined in claim 9, wherein the support member includes two support legs and a bar extending therebetween, the two support legs being oriented substantially parallel relative to each other and supported on the seat, and the frame is journaled to the bar; and the apparatus further includes
a stop member coupled to the bar and projecting upwardly therefrom;
a stop plate coupled to the frame and adapted to slide relative to the stop member; and
a spring coupled between the stop plate and the bar, wherein the spring biases the stop plate to slide relative to the stop member toward the front of the seat and, thus, biases the stop plate and frame toward the passenger's head.

11. An apparatus as defined in claim 10, wherein the stop plate defines an elongated aperture extending therethrough and adapted to receive the stop member therein, the elongated aperture permitting the stop plate to slide toward the front of the seat until a back wall defining the aperture engages the stop member to orient the apparatus in a downwardly rotated position, the elongated aperture further permitting the stop plate to slide toward the rear of the seat until a front wall defining the aperture abuts the stop member to orient the apparatus in an upright position.

* * * * *